United States Patent
LaPat

(10) Patent No.: US 8,698,058 B1
(45) Date of Patent: Apr. 15, 2014

(54) MISSILE WITH RANGING BISTATIC RF SEEKER

(75) Inventor: Ronald H. LaPat, Westford, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 434 days.

(21) Appl. No.: 12/842,175

(22) Filed: Jul. 23, 2010

(51) Int. Cl.
*F41G 7/22* (2006.01)
*G01S 13/88* (2006.01)
*F41G 7/00* (2006.01)
*G01S 13/00* (2006.01)

(52) U.S. Cl.
USPC ............ 244/3.19; 244/3.1; 244/3.15; 342/61; 342/62

(58) Field of Classification Search
USPC ........... 244/3.1–3.3; 342/59, 61, 62, 118, 145
See application file for complete search history.

(56) References Cited

U.S. PATENT DOCUMENTS

| | | | | |
|---|---|---|---|---|
| 3,812,493 A * | 5/1974 | Afendykiw et al. | ........... | 342/145 |
| 4,338,602 A * | 7/1982 | Roeder et al. | ................... | 342/62 |
| 4,537,371 A * | 8/1985 | Lawhorn et al. | ............. | 244/3.22 |
| 4,980,690 A * | 12/1990 | Fiden | ............... | 342/62 |
| 5,736,956 A * | 4/1998 | Kennedy et al. | ................ | 342/62 |
| 5,826,819 A * | 10/1998 | Oxford | ........................ | 244/3.14 |
| 6,150,974 A | 11/2000 | Tasaka et al. | | |
| 6,653,972 B1 * | 11/2003 | Krikorian et al. | ............... | 342/62 |
| 6,806,823 B1 | 10/2004 | Smith et al. | | |
| 6,839,017 B1 * | 1/2005 | Dillman | ........................ | 342/62 |
| 7,079,070 B2 * | 7/2006 | Kongelbeck et al. | ........... | 342/62 |
| 7,121,502 B2 * | 10/2006 | Krikorian et al. | ............. | 244/3.14 |
| 7,183,966 B1 | 2/2007 | Schramek et al. | | |
| 8,084,724 B1 * | 12/2011 | Brosch et al. | ................ | 244/3.16 |
| 2003/0151540 A1 * | 8/2003 | Faulkner | ........................ | 342/62 |
| 2003/0210170 A1 * | 11/2003 | Krikorian et al. | ............... | 342/62 |

* cited by examiner

*Primary Examiner* — Bernarr Gregory

(74) *Attorney, Agent, or Firm* — Howard IP Law Group, PC

(57) ABSTRACT

A ranging seeker apparatus includes an RF antenna and a bistatic ranging detector operatively connected with the RF antenna. The RF antenna and bistatic ranging detector are operative for detecting one or more guidance objects in a RF band and providing angle and range data to the missile. Also, a missile including a missile body, a missile propulsion system disposed in or on the missile body, and the ranging bistatic RF seeker disposed in or on the missile body.

20 Claims, 6 Drawing Sheets

MISSILE WITH RANGING BISTATIC RF SEEKER

STATEMENT OF GOVERNMENT INTEREST

This invention was made with Government support under Contract N00024-03-C-6110 awarded by the Department of the Navy. The Government has certain rights in this invention.

FIELD OF THE INVENTION

The disclosure relates to target tracking devices. More particularly, the disclosure relates to a missile with a ranging bistatic RF seeker.

BACKGROUND

High-velocity guided missiles are used for intercepting very fast targets, such as ballistic rockets, or highly maneuverable targets. Such missiles use a seeker to detect and guide the missile to the intended target.

Seeker-missiles typically employ optical, infrared (IR), radio frequency (RF), or multi-mode seekers for detecting and guiding the missile toward the intended target. Multi-mode seekers, may employ both an IR and/or optical seeker, and a RF seeker for detecting and guiding the missile toward the intended target.

Existing multi-mode seekers employ either an active RF seeker providing range and angle information for terminal guidance only, or employ a bistatic RF seeker that is not cohered with an illuminator, and therefore provides angle information only. Consequently, existing multi-mode seekers fail to provide range information over most or all of the intercept path, which degrades their ability to detect and guide the missile toward the intended target.

Accordingly, a seeker that provides the missile with ranging information offers the ability to resolve objects in range that are close in angle, and the ability to measure object distance for improved detection and guidance of the missile to its intended target.

SUMMARY

A seeker apparatus for a missile is disclosed herein. The apparatus includes a an RF antenna; and a bistatic ranging detector operatively connected with the RF antenna. The RF antenna and bistatic ranging detector are operative for detecting one or more guidance objects in a RF band and providing angle and range data to the missile.

Further disclosed herein is a missile including a missile body; a missile propulsion system disposed in or on the missile body; and a ranging bistatic RF seeker disposed in or on the missile body.

Also disclosed herein is a method for detecting and guiding a missile to a targeted object. The method includes illuminating the target object with RF illumination produced by a source external to and cohered with the missile; detecting RF illumination scattered by the targeted object with an RF seeker of the missile; estimating a range between the missile and the targeted object with the RF seeker using illuminator position data, missile position data, missile attitude data, targeted object delay data and target object angle data; and guiding the missile to the targeted object using the estimated range data.

Still further disclosed herein is a method far detecting and guiding a missile to an object targeted in a cluster of objects. The method includes illuminating the objects with RF illumination produced by a source external to and cohered with the missile; detecting RF illumination scattered by each of the objects with an RF seeker of the missile; estimating a range between the missile and each of the objects with the RF seeker using illuminator position data, missile position data, missile attitude data, and target object angle data; and guiding the missile to a selected one of the objects in the cluster of objects based on the estimated ranges, angles, and rates, the selected one of the objects being the targeted object.

DETAILED DESCRIPTION

Figure 1:
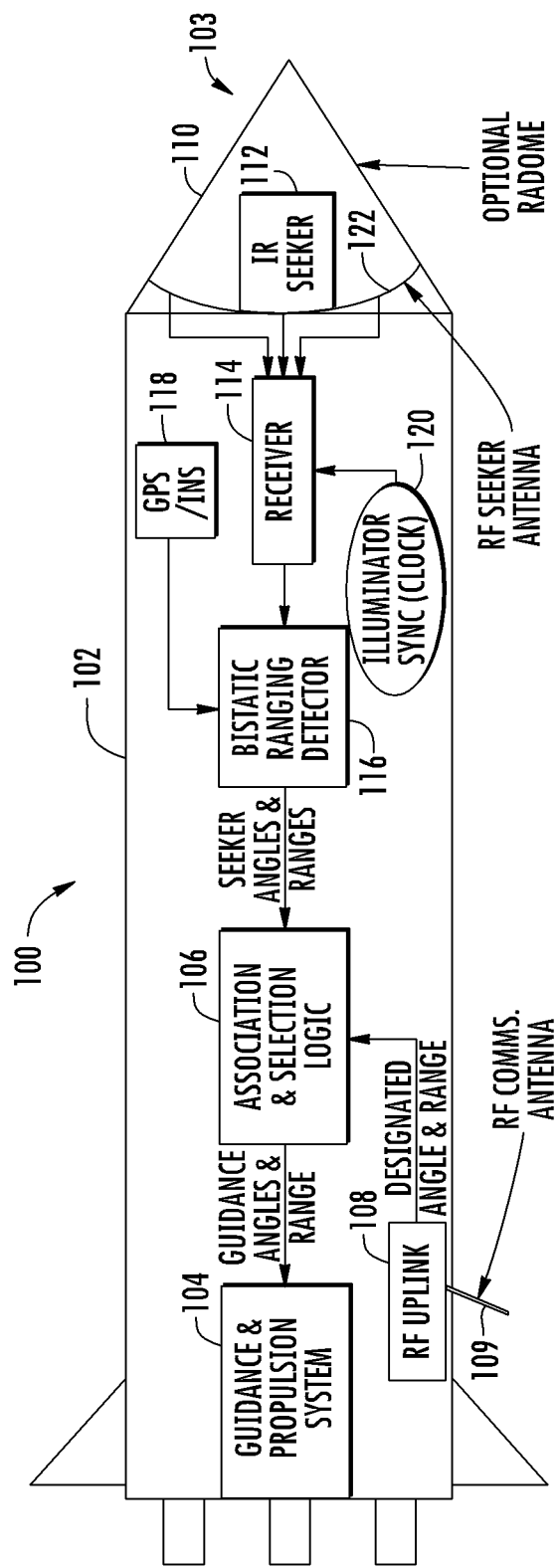
FIG. 1 is a schematic side view of an exemplary embodiment of a missile with bistatic RF ranging capability.

FIG. 1 shows an exemplary embodiment of a missile with bistatic RF ranging capability, designated by reference numeral 100. The missile 100 includes a missile body 102 that contains a guidance and propulsion system 104. The propulsion sub-system of the guidance and propulsion system 104 includes, for example, a rocket motor, a jet engine, or other thrust-producing device. The guidance and propulsion system provides missile guidance, control, and propulsion to enable the missile to intercept a targeted, moving, air-borne object (target object).

Figure 4:
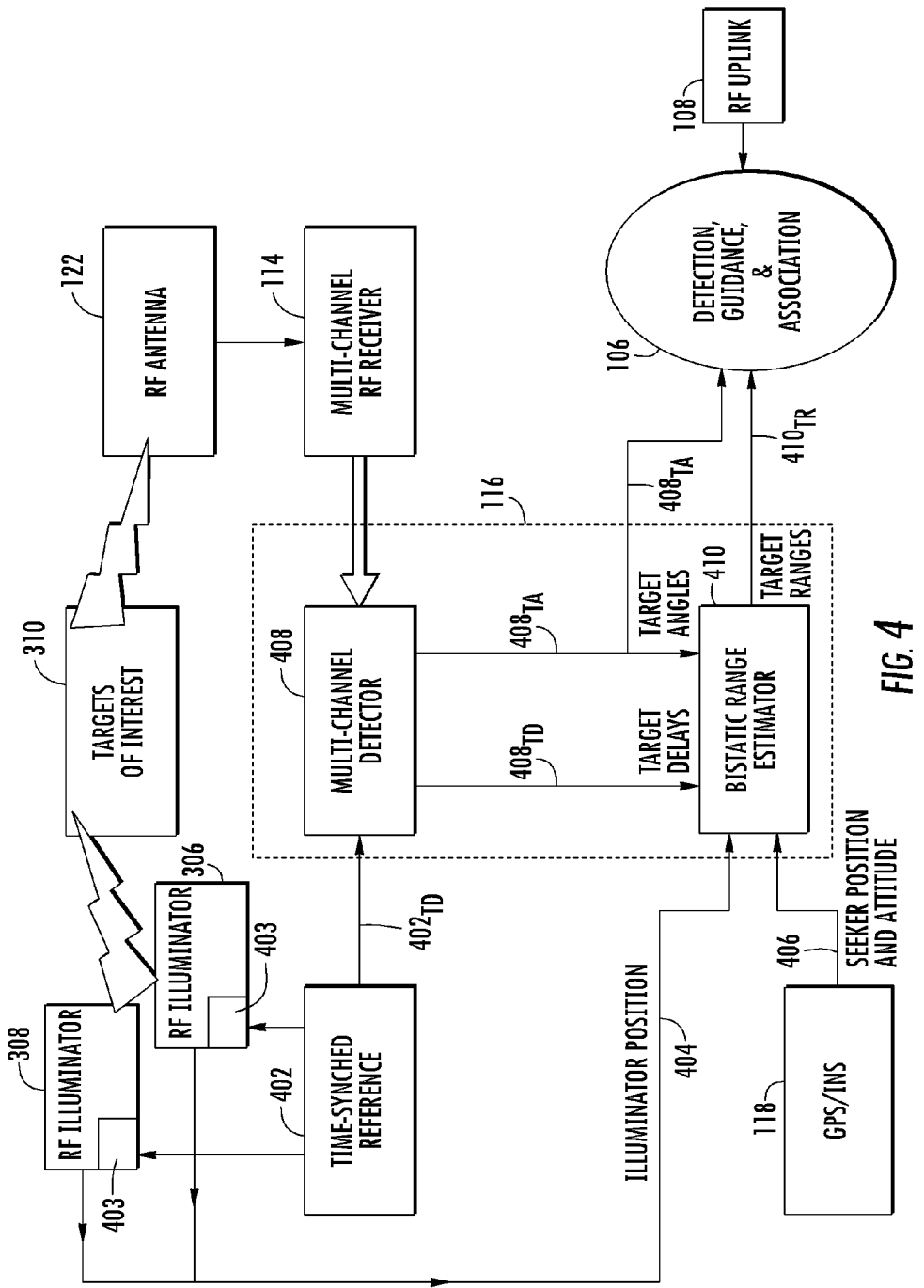
FIG. 4 is a block diagram detailing data flow in the system of FIG. 3.

The missile 100 further includes a ranging bistatic RF seeker (RF seeker) formed by an RF seeker antenna 122, a multi-channel receiver 114, and a bistatic ranging detector 116. The bistatic RF seeker detects the moving, air-borne targeted object or a cluster of moving, air-borne objects (one of which is the targeted object) in the RF band and provides angle and precision range data for object association and missile guidance. The RF seeker antenna 122 is located in a forward tip 103 of the missile 100 behind a dome 110 which is transparent to infrared and RF radiation. In other embodiments of the missile 100, the dome 110 may be omitted. The multi-channel receiver 114 is located in the missile body 102 and has one or more inputs that are operatively coupled to one or more outputs of the RF seeker antenna 122, and an output that is operatively coupled to an input of the bistatic ranging detector 116. As shown in FIG. 4, the bistatic ranging detector 116, in one embodiment, includes a multi-channel detector 408 and a bistatic range estimator 410 operatively coupled to an output of the multi-channel detector 408.

An IR seeker 112 can also be located in the forward tip 103 of the missile 100 behind the dome 110. The IR seeker 112 is operatively coupled to an input of the RF seeker's multi-channel receiver 114. The IR seeker 112 detects the moving targeted object or the cluster of moving objects that includes the targeted object, in the IR band and provides precision angle data for object association and missile guidance in conjunction with the ranging bistatic RF seeker. In other embodiments of the missile, the IR seeker 112 may be omitted.

An illuminator-synched high-precision clock 120 or other coherent timing source can be included in the missile body 102 of the missile 100, and is operatively coupled to the input of the multi-channel receiver 114. The illuminator-synched clock 120 provides the multi-channel receiver 114 with precision time delay data relating to one or more RF radar illuminators located remotely from the missile 100. In other embodiments, the clock 120 can be included in the RF seeker or be external to both the missile and RF seeker.

The missile 100 can further include a GPS/INS navigation system 118 (a global positioning system integrated with an inertial navigation system) operatively coupled to the bistatic ranging detector 116. The navigation system 118, in other embodiments, can be included in the RF seeker or be external to both the missile and the RF seeker. The GPS/INS navigation system 118 provides the bistatic ranging detector 116 with missile position and attitude data (seeker navigation data). The bistatic range detector 116 is constructed to generate RF seeker-observed target object angles and RF seeker-observed target object ranges. More specifically, the multi-channel detector 408 of the bistatic range detector 116 generates time synchronized detections, i.e., target object delays and target object angles. The target object angles at the output of the multi-channel detector 408 are available at the output of the bistatic range detector 116 for use in missile guidance and association. The bistatic range estimator of the bistatic range detector 116 uses the time synchronized detections (target delays and target angles) at the output of the multi-channel detector 408 and the missile or seeker navigation data (e.g., missile position, velocity, and/or attitude) at the output of the GPS/INS navigation system 118, to estimate target object ranges.

An RF communications antenna 109 is located on or in the missile body 102 of the missile 100. The RF communications antenna 109 is operatively coupled to an RF uplink 108 located in the missile body 102. The RF communications antenna 109 receives target object map (TOM) data (pertaining to the moving targeted object or the cluster of moving objects which includes the targeted object) from a missile firing platform 304 (FIG. 3) of the missile and/or a Radar Command and Control System 302 (FIG. 3) and the RF uplink 108 uploads the object data (TOM data) to an operatively coupled association and selection logic (ASL) unit 106 located in the missile body 102 of the missile 100. The ASL unit 106 is also operatively coupled to the input of the bistatic ranging detector 116 and an input of the guidance and propulsion system 104. The ASL unit 106 processes the object data received from the RF uplink 108 and the estimated seeker angle and range data at the output of the bistatic ranging detector 116, to associate by position and velocity, the moving targeted object or the cluster of moving objects that includes the targeted object observed or detected by the RF seeker (and the IR seeker if equipped), with targeted object guidance data provided by the missile firing platform 304 of the missile and/or the Radar Command and Control System 302 via the RF uplink, and in the case of the cluster of objects selects a "best" one of the objects in the cluster (i.e., the targeted object to intercept) for input to the guidance and propulsion system 104.

Figure 2:
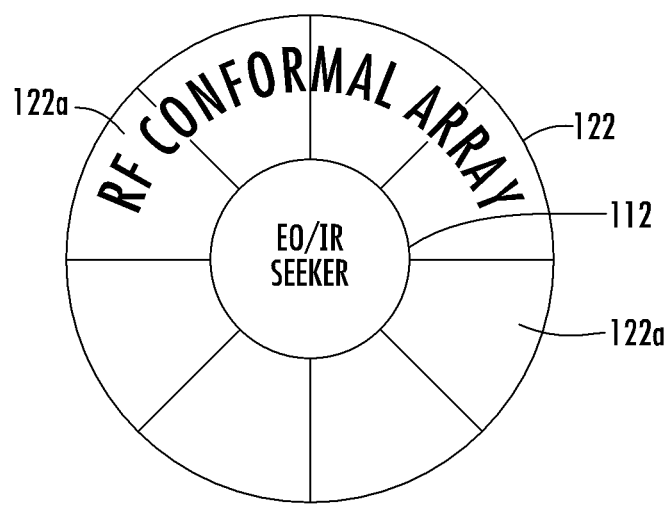
FIG. 2 is a schematic front view of the missile of FIG. 1.

FIG. 2 is a front view of the missile. As can be seen, the RF seeker antenna 122, in one exemplary embodiment, is formed by a set of sub-arrays 122a, each sub-array 112a being formed by one or more antenna elements. The sub-arrays 122a of the RF seeker antenna 122 conventionally sense and convert scattered RF radar illumination into a radar signal which is applied to the input of the multi-channel receiver 114.

Figure 3:
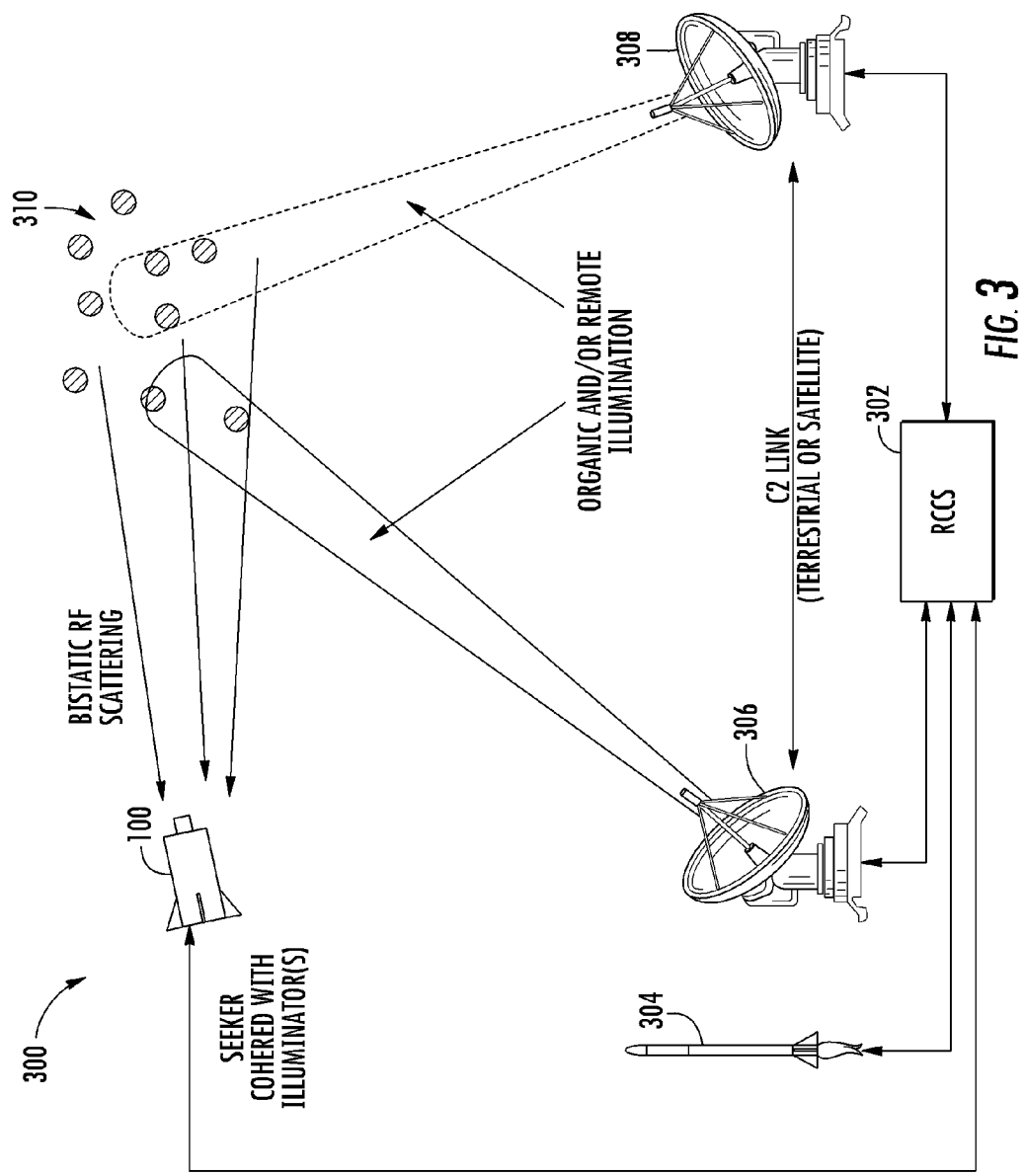
FIG. 3 is a schematic diagram of an exemplary embodiment of a system, in which the missile of FIG. 1 may be used.

FIG. 3 is a schematic diagram of an exemplary embodiment of a system, designated by reference numeral 300, in which the RF seeker-equipped missile 100 may be used. The system 300 includes, a Radar Command and Control System (RCCS) 302, a missile firing platform 304 for firing the missile 100, an RF illuminator 306 located at the firing platform 304, and/or one or more RF illuminators 308 located remote from the firing platform. The missile 100, the missile firing platform 304, the RF illuminator 306, and the remotely located RF illuminator(s) 308 are operatively coupled (using e.g., any suitable wireless method) with the RCCS 302. The RCCS 302 coordinates the missile 100, the missile firing platform 304 and the RF illuminators 306, 308 and provides command and control services between assets (not shown). The one or more remote RF illuminators 308 may be located on the ground, in the sky, at sea, in space or in or at any other remote location. In addition, the RF illuminators 306, 308 form an external RF radar illumination source for the missile 100.

Although the RF seeker-equipped missile 100 uses bistatic ranging in conjunction with some type of association logic to associate with an external TOM, it should be understood that in other embodiments, the RF seeker-equipped missile 100 can operate with just course guidance (point and direction) and without any external information.

Referring still to FIG. 3, the RCCS 302 directs the RF illuminator(s) (306, 308) to illuminate one or more air-borne objects 310 with remote RF radar illumination. The RF illuminators 306, 308 sense the RF illumination scattered by one or more objects in object cluster 310 and communicate this radar data (illuminator sensed radar data) to the RCCS 302. The RCCS 302 evaluates the illuminator sensed radar data and possibly data from other sensor assets (not shown), to produce targeted object guidance information for the missile 100. The RCCS 302 communicates the targeted object guidance information to the RF seeker-equipped missile 100 and/or the missile platform 304 and then, the RCCS 302 and/or the platform 304 fires the missile 100. As the missile 100 travels towards a targeted one of the objects in the cluster of objects 310, the missile 100 is cohered with the external illumination provided by first and second RF illuminators 306, 308 because the RCCS 302 continuously sends updated targeted object guidance information to the missile 100. The missile 100 receives and processes the targeted object guidance data and associates the cluster of objects 310 observed or sensed by the RF seeker and optionally, the IR seeker of the missile 100 with the target object guidance data provided by the missile firing platform 304 of the missile 100 and/or the Radar Command and Control System 302 to select the "best" one of the objects in the object cluster 310 (the targeted object to intercept) for input to the guidance and propulsion system 104 of the missile 100.

FIG. 4 is a block diagram detailing data flow in the system 300 of FIG. 3. The RF illuminators 306, 308 each have a coherent timing source 403 (e.g., a high-precision clock) that generates timing data. As the RF illuminators 306, 308 illuminate the one or more objects in the object cluster 310 and then sense the RF radar illumination scattered by the one or more objects in the object cluster 310, the timing data generated by the coherent timing sources 403 of the RF illuminators 306, 308 is time synchronize against a time-synched reference 402 (e.g., clock 120 of the missile 100 or an illuminator-synchronize clock). Accordingly, the RF illuminators 306, 308 form a coherent, external illumination source for the RF seeker-equipped missile 100 the RF illumination of which is cohered with the missile 100. The time-synched reference 402 coheres the multi-channel detector 408 of the bistatic range detector 116 with one or more remote RF radar illuminators 306, 308. Illuminator position data 404 provided by the RCCS 302, 308 and seeker position and attitude data 406 provided by the GPS/INS 118 of the missile 100, are applied to the bistatic range estimator 410 of the bistatic range detector 116 of the missile 100. The RF seeker antenna 122 of the missile 100 conventionally senses and converts the RF illuminator's radar illumination scattered by the objects in the cluster 310 into a radar signal (e.g., a voltage), which radar signal is communicated to the multi-channel receiver 114. The multi-channel receiver 114 conventionally processes the radar signal and applies the processed radar signal to the input of the multi-channel detector 408. The multi-channel detector 408 applies target object delay data 408-$m$ and target object angle data 408$_{TA}$ to the input of the bistatic range estimator 410. The multi-channel detector also applies the target object angle data 408$_{TA}$ to the input of the ASL unit 106. The bistatic range estimator 410 uses the illuminator position data 404, the seeker position and attitude data 406, the target object delay data 408$_{TD}$ and the target object angle data 408$_{TA}$, to estimate target object range data 410$_{TR}$ for each object detected in the cluster 310, which is applied to the input of the ASL unit 106. The ASL unit 106 processes the target object angle data 408$_{TA}$ received from the multichannel detector 408, the estimated target object range data 410$_{TR}$ received from the bistatic range estimator 410, and the object data (TOM data) 108$_O$ received from the RF uplink 108, to perform the earlier described association and guidance functions, i.e., associate the one or more target objects observed or detected by the RF seeker of the missile 100 with the guidance object data (e.g., object track and discrimination data) provided by the missile firing platform 304 of the missile and/or the Radar Command and Control System 302, and select the best guidance object (the object in the cluster which best matches targeted object to hit) for input to the guidance and propulsion system 104 of the missile 200. Any suitable matching method, such as a goodness-of-fit or closeness metric, can be used for selecting the best guidance object.

Figure 5A:
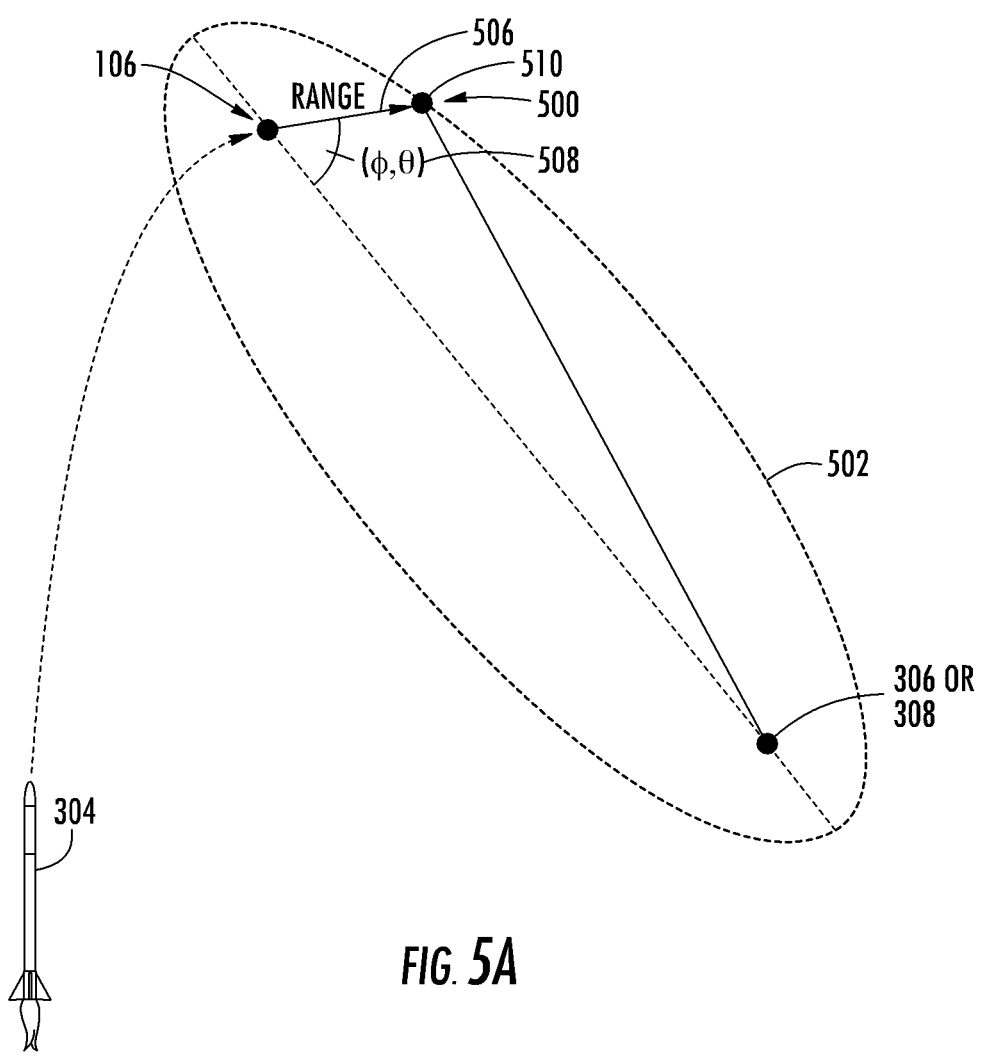
FIG. 5A schematically illustrates how the bistatic range detector computes the range (bistatic range) of each one of the objects of a cluster of moving, air-borne objects (the range between the missile and the object).

FIG. 5A schematically illustrates how the bistatic ranging detector 116 of the RF seeker-equipped missile 100 calculates the range (bistatic range) of each one of the objects (the target object for that calculation) of the cluster (the range 506 between the RF seeker-equipped missile 100 and the target object 500). The RF seeker of the missile 100 senses or detects a response by each one of the target objects 500, to a given one of the RF illuminators (either RF illuminator 306 or 308) along a surface 502 of constant time delay, i.e., an iso-delay surface. The iso-delay surface 502 can be determined by measuring the time delay difference between the received waveform and the on-missile waveform generated from the cohered clock. The iso-delay surface 502 forms an ellipsoid whose two foci are coincident with the RF illuminator 306 or 308 and the missile 100. For each one of the target objects 500 of the cluster, the distance or range 504 from the missile 100 to the target object 500 is the point of intersection 510 between the ellipsoid surface 502 and a line 506 subtended in the seeker observed direction 508 defined by angles Φ, Θ. The angles Φ, Θ can be determined using a monopulse or phase difference of arrival technique. Because the RE seeker of the missile 100 and the RF illuminator 306 or 308 are cohered, i.e., the timing data generated by the coherent timing sources 403 of the RF illuminators 306, 308 is time synchronized against the time-synched reference 402, the bistatic ranging detector 116 of the RF seeker of the missile 100 can estimate the range 506 between the missile 100 and the target object 500. In one exemplary embodiment, the illuminator waveforms are time and/or phase coded to maximize range resolution, accuracy, and detection; and minimize range ambiguity. Time and/or phase coding is often employed in other digital communications systems, such as GPS, for instance for similar reasons stated.

Figure 5B:
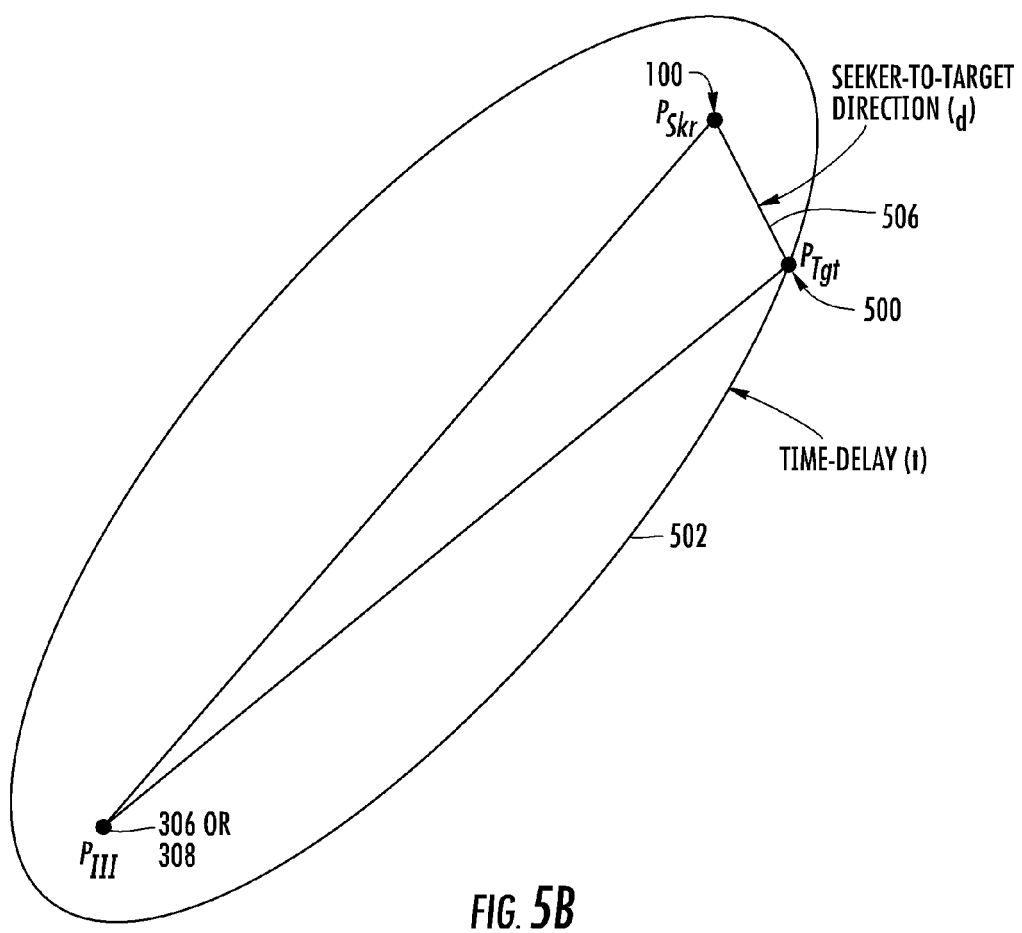
FIG. 5B depicts an iso-delay surface for illustrating bistatic range calculations.

The bistatic range calculations performed by the bistatic ranging detector 116 of the RF seeker-equipped missile 100 will now be described with reference to the iso-delay surface 502 ($\tau$) illustrated in FIG. 5B. Given the following expressions:

$$\|P_{Tgt} - P_{Skr}\| + \|P_{Tgt} - P_{Ill}\| c \cdot \tau$$

$$P_{Tgt} = P_{Skr} + R \cdot d$$

$$R = \frac{c^2 \cdot \tau^2 - [P_{Skr} - P_{Ill}]^T [P_{Skr} - P_{Ill}]}{2 \cdot (s \cdot \tau + d^T [P_{Skr} - P_{Ill}])}.$$

where:

$P_{Tgt}$ is the location vector or point of the target object 500 on the iso-delay surface 502;

$P_{Skr}$ is the location vector or point of the RF seeker-equipped missile 100 on the iso-delay surface 502;

$P_{Ill}$ is the location vector or point of the RF illuminator 306 or 308 on the iso-delay surface 502;

$\|P_{Tgt} - P_{Skr}\|$ is the norm of the distance on the iso-delay surface 502 between the point of the target object 500 and the point of the RF seeker-equipped missile 100;

$\|P_{Tgt} - P_{Ill}\|$ is the norm of the distance on the iso-delay surface 502 between the point of the target object 500 and the point of the RF illuminator 306 or 308;

c is the velocity constant for speed of light; and d is the RF seeker-equipped missile-to-target object direction vector, the bistatic range R, i.e., the range between the RF seeker-equipped missile 100 and the target object 500, can be estimated using the following expression:

$$d = \begin{matrix} |\cos(\varphi) \cdot \cos(\theta)| \\ |\cos(\varphi) \cdot \sin(\theta)| \\ |\sin(\varphi)|, \end{matrix}$$

The bistatic range data (the estimated target object range data 410$_{TR}$) can then be used by the ASL unit 106 along with the target object angle data 408$_{TH}$ and the object data (TOM data) 108$_O$, to perform the earlier described association and guidance functions and select the best guidance object (target object to hit) for input to the guidance and propulsion system 104 of the missile 200.

While exemplary drawings and specific embodiments have been described and illustrated herein, it is to be understood that that the scope of the present disclosure is not to be limited to the particular embodiments discussed. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. A seeker apparatus for a missile, the seeker apparatus comprising:
   an RF antenna; and a bistatic ranging detector operatively connected with the RF antenna,
   wherein the RF antenna and the bistatic ranging detector are configured to:
      detect RF illumination scattered by a targeted object illuminated with RF illumination produced by one or more remote RF illuminators cohered with the missile;
      estimate a range between the missile and the targeted object using illuminator position data, missile position data, missile attitude data, and targeted object guidance data; and
      guide the missile to the targeted object using the estimated range.

2. The seeker apparatus according to claim 1, further comprising a multi-channel receiver operatively coupled between the RF antenna and the bistatic ranging detector.

3. The seeker apparatus according to claim 2, further comprising a coherent timing source for providing the multi-channel receiver with time delay data relative to the one or more remote RF illuminators.

4. The seeker apparatus according to claim 3, wherein the coherent timing source comprises an illuminator-synched high-precision clock source.

5. The seeker apparatus according to claim 2, further comprising a navigation system operatively coupled to the bistatic ranging detector, the navigation system providing the bistatic ranging detector with seeker navigation data.

6. The seeker apparatus according to claim 5, wherein the bistatic ranging detector uses the seeker navigation data and time synchronized detections provided by the multi-channel receiver to estimate seeker-observed target object angles and target object ranges.

7. A missile comprising:
   a missile body;
   a missile propulsion system; and
   a ranging bistatic RF seeker including an RF antenna and a bistatic ranging detector operatively connected with the RF antenna, wherein the RF antenna and the bistatic ranging detector are configured to:
      detect RF illumination scattered by a targeted object illuminated with RF illumination produced by one or more remote RF illuminators cohered with the missile;
      estimate a range between the missile and the targeted object using illuminator position data, missile position data, missile attitude data, and targeted object guidance data; and
      guide the missile to the targeted object using the estimated range.

8. The missile according to claim 7, wherein the ranging bistatic RF seeker further includes a multi-channel receiver operatively coupled between the RF antenna and the bistatic ranging detector.

9. The missile according to claim 8, further comprising a coherent timing source for providing the multi-channel receiver with time delay data relative to the one or more remote RF illuminators.

10. The missile according to claim 9, wherein the coherent timing source comprises an illuminator-synched high-precision clock.

11. The missile according to claim 7, further comprising a navigation system operatively coupled to the bistatic ranging detector, the navigation system providing the bistatic ranging detector with seeker navigation data.

12. The missile according to claim 11, wherein the bistatic ranging detector uses the seeker navigation data and time synchronized detections provided by the multi-channel receiver to estimate seeker-observed target object angles and target object ranges.

13. The missile according to claim 7, further comprising:
   an RF communications antenna in or on the missile body;
   an RF uplink operatively coupled to the RF communications antenna; and
   an association and selection logic unit operatively coupled to the RF uplink,
   wherein the RF communications antenna receives target object map data and the RF uplink uploads the target object map data to the association and selection logic unit.

14. The missile according to claim 13, further comprising a guidance system disposed in or on the missile body, wherein the association and selection logic unit is operatively coupled to the bistatic ranging detector and the guidance and propulsion systems, wherein the association and selection logic unit processes the target object map data received from the RF uplink and the estimated seeker angle and range data at the output of the bistatic ranging detector, to associate the targeted object observed or detected by the RF seeker with the target object map data provided by one or both of a missile firing platform of the missile and a Radar Command and Control System via the RF uplink, and selects a best guidance object for input to the guidance and propulsion systems.

15. The missile according to claim 7, wherein the missile further comprises one or both of an IR seeker and an optical seeker.

16. A method for detecting and guiding a missile to a targeted object, the method comprising:
   illuminating the targeted object with RF illumination produced by a source external to and cohered with the missile;
   detecting RF illumination scattered by the targeted object with an RF seeker of the missile;
   estimating with the RF seeker a range between the missile and the targeted object using illuminator position data, missile position data, missile attitude data, targeted object delay data, and targeted object angle data; and
   guiding the missile to the targeted object using the estimated range and angle data.

17. The method according to claim 16, wherein the range is further estimated using data from an IR seeker.

18. A method for detecting and guiding a missile to an object targeted in a cluster of objects, the method comprising:
   illuminating the objects with RF illumination produced by a source external to and cohered with the missile;
   detecting RF illumination scattered by each of the objects with an RF seeker of the missile;
   estimating with the RF seeker a range between the missile and each of the objects using illuminator position data, missile position data, missile attitude data, and target object guidance data; and
   guiding the missile to a selected one of the objects in the cluster of objects based on the estimated ranges, the selected one of the objects being the targeted object.

19. The method according to claim 18, wherein the target object guidance data includes target object delay data and target object angle data.

20. The method according to claim 19, wherein the guiding the missile to the selected one of the objects in the cluster of objects includes:
- comparing the estimated range of each of the objects with target object guidance data; and
- selecting the object in the cluster having the estimated range and angle position, and potentially associated rate and rate derivatives, that best match the target object guidance data.

* * * * *